United States Patent [19]

Ellis

[11] Patent Number: 4,840,352
[45] Date of Patent: Jun. 20, 1989

[54] BLOW PLUG

[76] Inventor: Roy J. Ellis, 430 E. Cascada Rd., Litchfield Park, Ariz. 85340

[21] Appl. No.: 150,780

[22] Filed: Feb. 1, 1988

[51] Int. Cl.⁴ ........................................... B65H 59/00
[52] U.S. Cl. ................................................ 254/134.4
[58] Field of Search ................... 254/134.4, 134.3 FT; 269/48.1

[56] References Cited

U.S. PATENT DOCUMENTS

| | | |
|---|---|---|
| 423,134 | 3/1890 | Cope. |
| 2,767,676 | 10/1956 | Johnson et al. .................. 269/48.1 |
| 3,301,531 | 1/1967 | Corsiglia. |
| 3,793,732 | 2/1974 | Hamuck. |
| 4,382,581 | 5/1983 | Wimer et al. . |

FOREIGN PATENT DOCUMENTS 469451  11/1950  Canada ............................ 254/134.4

OTHER PUBLICATIONS

FPL Qualtec, Inc. Brochure, "ATCC Cable Pulling System".

Primary Examiner—Robert C. Watson
Attorney, Agent, or Firm—Cahill, Sutton & Thomas

[57] ABSTRACT

A blow plug for closing the end of the conduit to seal the conduit so that a pulling plug can be propelled by compressed air through the conduit to pull a lead line through the plug and into the conduit. The plug comprises a split sleeve that is expanded by a wedge into engagement with the inner surface of the conduit to mechanically lock the plug in the entry end of the conduit. The larger end of the wedge has a resilient sealing member associated therewith which is compressed by the same mechanism employed to force the wedge into the sleeve. Compression of the sealing member causes the periphery of that member to expand into sealing engagement with the inner surface of the conduit. The plug has provisions for feeding the lead line therethrough into the conduit and provisions for introducing air into the conduit through the plug.

10 Claims, 2 Drawing Sheets

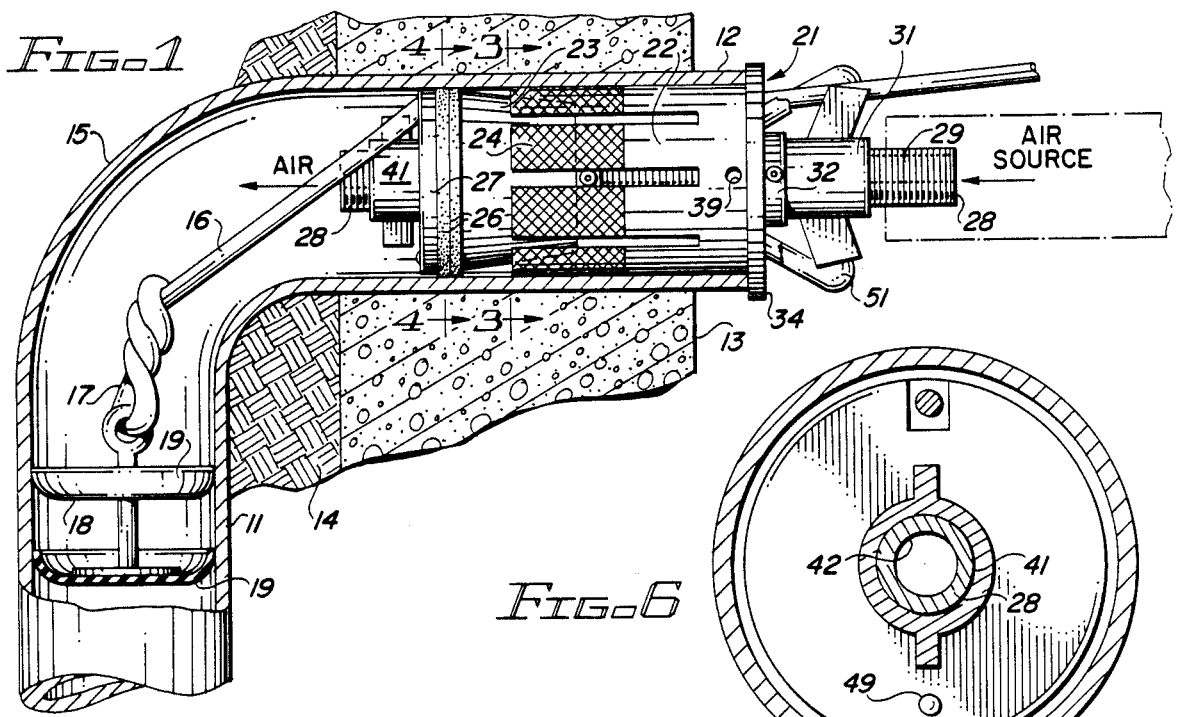
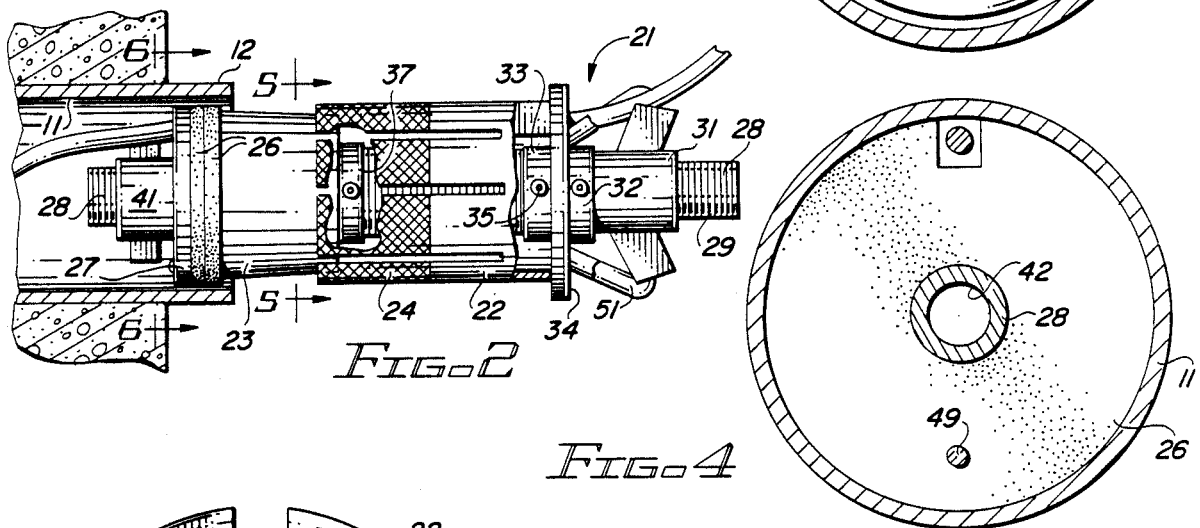
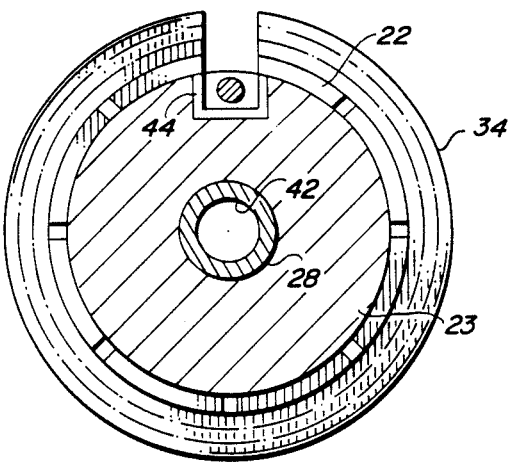
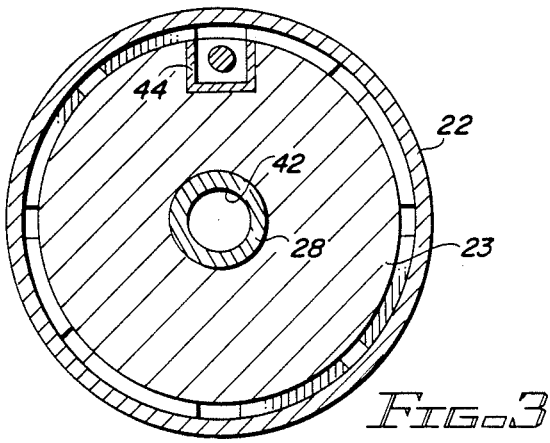

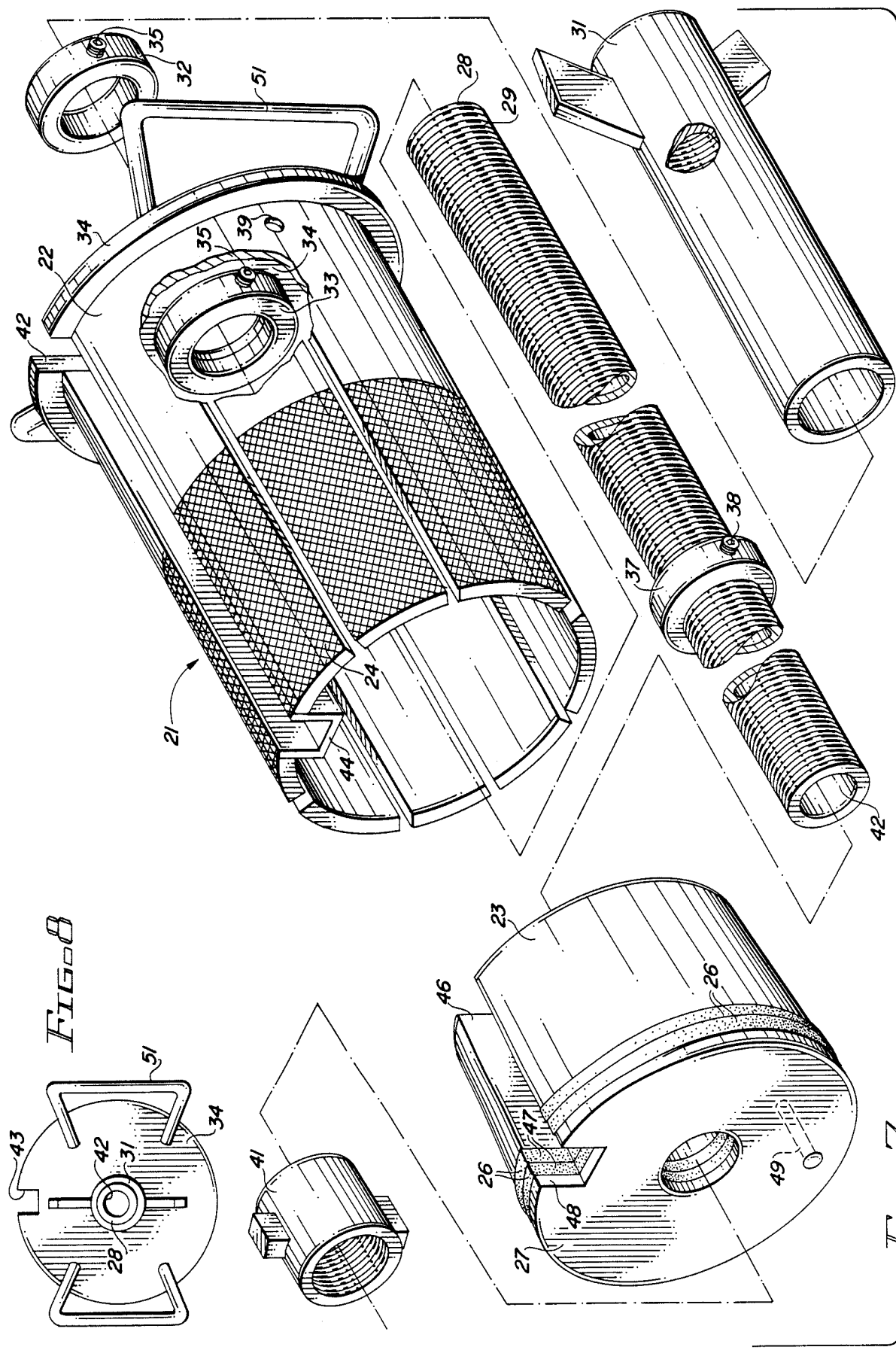

4,840,352

1

BLOW PLUG

TECHNICAL FIELD

This invention is concerned with the installation of electrical cables in conduits provided therefor in power distribution and other electrical systems.

BACKGROUND ART

It has become common practice to house power distribution cables in conduits to isolate and protect the cables from elements which might damage them or cause them to deteriorate. In practice, the conduits are fashioned to direct the cables to desired locations and are literally built into the system, or structure, or building. The cables are installed later by running lead lines through the conduits and utilizing these lead lines to pull the cables into place in their respective conduits.

Running a lead line through a lengthy conduit with numerous bends therein can be a difficult task. One of the most successful practices that has been devised for this purpose involves pulling a lead line into the conduit behind a pulling plug (also sometimes called a "birdie" or a "rabbit") which is propelled through the conduit by compressed air introduced into the conduit behind the plug. This practice has been known at least as early as Mar. 11, 1890 when U.S. Pat. No. 423,134 was granted to T. J. Cope for "LAYING ELECTRICAL CONDUCTORS".

The apparatus devised by T. J. Cope and subsequently improved on by others employed members which were manually held against the entry end of the conduit to seal the conduit so that air pressure could be built up therein to propel the pulling plug. U.S. Pat. Nos. 3,301,531, granted Jan. 31, 1967, to R. J. Corsiglia for "APPARATUS FOR INSTALLING ELECTRICAL WIRE IN ELECTRICAL CONDUIT" and 3,793,732, granted Feb. 26, 1974 to J. C. Hamrick for "METHOD AND APPARATUS FOR INSTALLING HEAVY ELECTRICAL CONDUCTOR LINES IN CONDUITS" disclose apparatus of this character. Such apparatus was capable of establishing only a very low air pressure within the conduit and consequently the pulling plugs were capable of pulling only lightweight lead lines. Such lead wires were too fragile to be used to directly pull heavy electrical power distribution cables through the conduits. The rather laborious practice was introduced of pulling a succession of lead lines of increasing diameter and strength until one was pulled through that had sufficient strength to in turn pull the electrical cable through.

More recently it has come to be recognized that if the apparatus employed to plug the entry end of the conduit could be mechanically affixed to the conduit it would be capable of maintaining a higher air pressure within the conduit. The higher air pressure, in turn, could drive the pulling plug with greater force and enable it to pull a heavier weight, stronger lead line. The pulling of lighter and intermediate weight lead lines could thus be eliminated. The device for mechanically closing the entry end of a conduit and having provisions for admitting both air under pressure and a lead line to the conduit is hereinafter referred to as a "blow plug".

U.S. Pat. No. 4,382,581, granted May 10, 1983 to D. W. Wimer et al. for "APPARATUS FOR PULLING CABLE THROUGH UNDERGROUND CONDUIT" discloses one such blow plug intended to facilitate the pulling of heavier lead lines. Wimer et al. propose the use of an "air gun" having an expandable rubber ring which constitutes the sole means for sealing the end of the conduit and for mechanically holding the gun in the conduit. It can be readily appreciated that the rubber ring could conceivably slip within the smooth bore of a conduit. The reliability of the Wimer et al. air gun consequently is questionable. In addition, the Wimer et al. gun employs a rather complex trap door arrangement to permit the lead line to be fed into and through the gun.

There is a continuing need, therefore, for a blow plug which is both reliable and easy to use.

DISCLOSURE OF THE INVENTION

The blow plug of this invention is of a type which both mechanically locks to the inner surface of the conduit and provides a separate arrangement for pneumatically sealing the entry to the conduit. The plug comprises a split sleeve that is expanded by a wedge into engagement with the inner surface of the conduit to mechanically lock the plug into the entry end of the conduit. The larger end of the wedge has a resilient sealing member which is compressed by the same mechanism which is employed to force the wedge into the split sleeve. Compression of the sealing member causes the periphery of the sealing member to expand into pneumatic sealing engagement with the inner surface of the conduit. Forces employed to act on the wedge and the resilient sealing member are transmitted through the plug by an elongated member which also has an axial opening therethrough to provide an air passage through the plug. A slot-like arrangement in the peripheries of the sleeve, the wedge, and the sealing member provides for passage of a lead line into the conduit.

BRIEF DESCRIPTION OF THE DRAWINGS

The invention is described in greater detail hereinafter by reference to the accompanying drawings wherein:

FIG. 1 is an elevational view partially in section illustrating the installation of the blow plug of this invention in an electrical cable conduit;

FIG. 2 is a view similar to FIG. 1 illustrating the condition of the blow plug as it is inserted into or removed from the conduit;

FIGS. 3 and 4 are vertical sectional views taken generally as indicated by lines 3—3 and 4—4, respectively, in FIG. 1;

FIGS. 5 and 6 are vertical sectional views taken generally as indicated by lines 5—5 and 6—6, respectively, in FIG. 2;

FIG. 7 is an exploded perspective view illustrating the various components of the blow plug of this invention; and FIG. 8 is an elevational view of the outer end of the blow plug.

BEST MODE FOR CARRYING OUT THE INVENTION

FIG. 1 illustrates, somewhat diagrammatically, an electrical conduit installation which can be considered to present typical problems for installation of an electrical cable therein. The conduit is identified by the reference numeral 11 and has its entry end 12 imbedded in the concrete wall 13 of a vault or other structure. The conduit 11 extends outside the concrete wall into the earth 14 and possesses one or more bends 15 which must be traversed for installation of the electrical cable (not shown).

This invention is intended to facilitate the installation of a lead line 16 into and through conduit 11 and which is to be used to pull the electrical cable into and through the conduit. Lead line 16 may comprise a fibrous rope, although for the reliable installation of heavier electrical cables it is desirable to use a wire cable for the line.

In what is considered to be conventional practice nowadays lead line 16 is attached at its forward end 17 to a pulling plug, or birdie, 18. Plug 18 comprises a pair of flexible disks 19 which are snugly received within the interior of conduit 11 so that the plug can be propelled through the conduit by air under pressure within the conduit and behind the plug.

The entry end 12 of conduit 11 is closed and at least partially sealed by means of a blow plug indicated generally at reference numeral 21. Blow plug 21 is an elongated cylindrical structure which, in its non-sealing condition, is adapted to be slidingly received within the interior of conduit 11 as shown in FIG. 2. Blow plug 21 is capable of assuming a second condition, as shown in FIG. 1, in which the plug is mechanically affixed to the conduit 11 and is capable of pneumatically sealing the entry end 12 of the conduit.

The mechanical locking feature of blow plug 21 is provided by a slotted, hollow cylindrical sleeve 22 and a frusto conical wedge 23 which is axially moveable into and out of an open end of sleeve 22 to respectively expand and contract the finger-like regions of the slotted sleeve. When a force is applied to the wedge 23 to move it into the sleeve 22 the fingers, or tines, of the sleeve 22 are forced outwardly into firm contact with the inner surface of conduit 11. This condition is illustrated in FIGS. 1 and 3. If desired, the outer surface of the sleeve 22 can be knurled as indicated at 24 to increase the frictional engagement between the sleeve and the conduit to prevent the plug 21 from being blown out of the conduit from the air pressure built up within the conduit. When a force is applied to wedge 23 to partially withdraw the wedge from inside sleeve 22 as shown in FIG. 2 the finger portions of the sleeve 22 contract, reducing the diameter of the sleeve 22 and disengaging the sleeve from the conduit 11 so that the plug 21 can be removed from the conduit.

The end of wedge 23 opposite that which is intended to enter sleeve 22, i.e. the larger diameter end, has associated therewith one or more resilient sealing members 26. Sealing members 26 are made of disks of rubber, or other resilient materials, having cylindrical peripheral regions. Sealing members 26 are backed up by a compression plate 27. When a force is applied to compression plate 27 in a direction to force wedge 23 into sleeve 22, compressive forces are applied to the resilient sealing members 26. When the wedge 23 and sleeve 22 become firmly wedged within conduit 11 the compressive force acting on the sealing members 26 builds up to the point where the peripheral regions of members 26 are extruded outwardly into engagement with the inner surface of conduit 11. In other words, the periphery of each sealing member 26 is expanded to come into sealing engagement with the interior of conduit 11. There are thus provided mechanisms for both mechanically locking the blow plug 21 within the entry end of conduit 11 and sealing the plug against the inner surface of the same general region of the conduit.

The mechanism for applying the wedging force to wedge 23 and the compressive force to sealing members 26 comprises an elongated force transmitting member 28 which extends axially through the blow plug 21 and carries means for connecting the member 28 to the sleeve 22, the wedge 23 and the compression plate 27. One component of this connecting means is a series of helical threads 29 on the outer surface of force transmitting member 28. The threads 29 are required only at the opposite ends of member 28, but may be provided throughout the length of that member if desired.

The connection between the force transmitting member 28 and sleeve 22 is by way of a wing nut 31 having a pair of collars 32 and 33 carried thereon and positioned on opposite sides of a closure plate 34 affixed to the outer end of sleeve 22. This arrangement is best shown in FIG. 7 of the drawings. Each of the collars 32 and 33 has a set screw 35 therein by which it is held tightly in position on wing nut 31.

The opposite end of force transmitting member 28 is connected to wedge 23 and compression plate 27 by means of a collar 37 held in place by a set screw 38 in close proximity to the inner, or small, end of wedge 23. For assembly purposes, the set screw 38 of collar 37 is accessible through one of the slots in the slotted sleeve 22 and set screw 35 in collar 33 is accessible through a hole 39 in sleeve 22. Threadably received on the end of force transmitting member 28 is another wing nut 41 which is adapted to bear against compression plate 27 and together with collar 37 control the initial positioning of the wedge 23 in relation to sleeve 22 and the initial compression of sealing members 26.

In operation, turning wing nut 31 in a direction for shortening the distance between collar 32 and wing nut 41 has the effect of pulling the wedge 23 into the slotted sleeve 22 and of eventually compressing and extruding the periphery of the sealing members 26. Turning the wing nut 31 in the opposite direction has the effect of lengthening the distance between collar 33 and collar 37 so that the wedge 23 is withdrawn at least partially from slotted sleeve 22 to permit that member to relax so that the blow plug 21 can be inserted in and withdrawn from the entry 12 of conduit 11.

In order to function as intended, the blow plug 21 must, of course, be equipped with means for admitting air under pressure through the plug into the interior of conduit 11 to provide the forces for propelling pulling plug 18 therethrough. A simple expedient for this purpose is to provide force transmitting member 28 with an axial opening 42 therein to provide an air passage. The exposed, outer, end of member 28 is, of course, intended to be connected to a source of air under pressure (not shown).

The blow plug 21 also includes means for feeding the lead line 16 therethrough into the interior of conduit 11. This means comprises a slot-like passage at the periphery of the blow plug 21 extending the entire longitudinal extent of the plug. This passage includes a notch 43 in closure plate 34 and a U-shaped elongated channel member 44 which is welded or otherwise fixed in a slot provided in the sleeve 22 (see FIG. 7). Aligned with these passage members is a slot 46 in wedge 23 which is adapted to closely receive an end region of U-shaped channel 44. Similarly, the sealing members 26 and the compression plate 27 are provided with notches 47 and 48, respectively, in line with the slot 46 in wedge 23. If desired, the notches 47, 48 and slot 46 can be kept in alignment with an alignment pin 49.

It can be appreciated that the U-shaped channel 44 and the series of notches 43, 46, 47, 48 provide a convenient and accessible passageway into which the lead line 16 can readily be threaded through the blow plug 21. The lead line is simply laid in the passageway before blow plug 21 is inserted into the conduit 11. No portion of the blow plug need be moved or dismantled for the purpose of inserting the lead line. If desired, the notches 47 in the sealing members 26 can be shaped to approximate the cross-section of the lead line 16 passing therethrough. However, in most instances, this will not be necessary because the air pressure requirements within the conduit 11 are such that any leakage through the passage containing the lead line is slight and of no consequence so far as operation of the system is concerned.

If desired, the blow plug 21 can be provided with means for carrying and transporting the plug by affixing handles 51 to the closure plate 34 affixed to sleeve 22. These handles 51 can considerably facilitate handling blow plugs for conduits of larger diameters.

With the compression plate 27, the sealing members 26 and the wedge 23 at the inner end of blow plug 21, air pressure which builds up in conduit 11 acts to further compress sealing members 26, thereby enhancing the pneumatic seal, and forces wedge 23 into sleeves 22, thereby enhancing the mechanical connection between the plug and the conduit.

From the foregoing it should be apparent that this invention provides a blow plug structure which can be reliably used to close the end of a conduit and which is quite easy to use.

What is claimed is:

1. A conduit plug comprising a cylindrical split sleeve, a wedge having a narrow end and a wide end, said wedge being adapted to be moved into said sleeve to expand the sleeve into contact with the inner surface of the conduit, a resilient sealing member positioned at the wide end of said wedge and having a cylindrical periphery, a compression member overlying said sealing member, means for applying a force to said compression member to move said wedge into said sleeve and to compress the sealing member to cause the periphery of said sealing member to expand into sealing engagement with the inner surface of the conduit, means providing an air passage through the conduit plug and means providing a lead line passage through the conduit plug.

2. The conduit plug of claim 1 further comprising an end closure for the end of said sleeve opposite the end receiving said wedge, and the means for applying a force to said compression member comprises an elongated force transmitting member extending through said sleeve, said wedge, said sealing member and said compression member, and means on said elongated member for engaging said end closure and said compression member.

3. The conduit plug of claim 2 further characterized in that the means on said elongated member is effective to move said wedge into and out of said sleeve.

4. The conduit plug of claim 2 further characterized in that said elongated member has an axial opening therethrough which constitutes the means for providing the air passage through the conduit plug.

5. The conduit plug of claim 2 further characterized in that said elongated member has a threaded exterior surface and the means on the elongated member for engaging said end closure is a nut.

6. The conduit plug of claim 4 further characterized in that said elongated member has a threaded exterior surface and the means on the elongated member for engaging said end closure is a nut.

7. The conduit plug of claim 1 further comprising handle means associated with said sleeve for transporting the plug.

8. The conduit plug of claim 2 further comprising handle means attached to said end closure for transporting the plug.

9. The conduit plug of claim 1 wherein said means for providing the lead line passage through the plug comprises a Ushaped channel joining adjacent sections of said split sleeve.

10. The conduit plug of claim 9 further characterized in that the means for providing the lead line passage further comprises slots in the periphery of said wedge, said sealing member and said compression member, said slots being aligned with said U-shaped channel on said sleeve.

* * * * *